July 1, 1969   R. L. LICH   3,452,684

RESILIENTLY CENTERED RAILWAY POWER TRUCK

Filed Aug. 10, 1967

INVENTOR:
RICHARD L. LICH

BY Bedell & Burgess
ATTORNEYS.

United States Patent Office 3,452,684
Patented July 1, 1969

3,452,684
RESILIENTLY CENTERED RAILWAY POWER TRUCK
Richard L. Lich, Town and Country, Mo., assignor to General Steel Industries, Inc., Granite City, Ill., a corporation of Delaware
Filed Aug. 10, 1967, Ser. No. 659,724
Int. Cl. B61c 17/00; B61f 1/14, 13/00
U.S. Cl. 105—175
10 Claims

ABSTRACT OF THE DISCLOSURE

A railway three-axle power truck in which separate traction motors are operatively connected to each axle, means providing a laterally movable center pivot over the middle axle without interference with the middle axle motor or substantially increasing the height of the underframe support. The truck frame is supported by equalizers from the axles to accommodate the truck freely to vertical track curvature and has four longitudinally and laterally spaced upwardly facing horizontally sliding bearings at the intersections of the transoms and the frame side members between the middle and end axles for slidably supporting shoes rigidly depending from the locomotive underframe. A beam with ends resting on the transoms extends longitudinally between them over the middl axle and is formed at its center with a vertical cylindrical bearing to pivotally receive a cylindrical element rigidly depending from the underframe, the ends of said beam being connected to the transoms by centering devices, said beam being relatively shallow vertically because it is vertically unloaded.

Field of the invention

The invention relates to railway rolling stock and consists particularly in a power truck having three motorized axles, with means for providing a lateral motion pivot at the center of the truck while maintaining a low underframe height.

Description of the prior art

Past efforts to provide clearance above the middle axle motor of three-axle trucks have resulted in trucks having the swivel support of the underframe offset longitudinally of the truck from the center and usually positioned on an intermediate transom between the middle axle and an end axle, even though it is preferable that swivel take place at the longitudinal center of the truck.

Power trucks have also been provided with four upwardly facing bearings on a sprung bolster and an unloaded swivel point at the middle of the bolster. Because of the spring support of the bolster, tractive forces tend to tip the frame lengthwise, causing a load transference from the leading to the rear axle with considerable reduction in tractive power of the locomotive.

Summary of the invention

The invention solves the problems of maintaining a low underframe height without interference with the middle axle motor, and of substantially reducing objectionable load transference by nonresiliently supporting the underframe on the truck frame at points spaced apart lengthwise of the truck and providing a vertically unloaded swivel point on a shallow beam connected by centering device to the intermediate transoms on both sides of the middle axle.

Description of the preferred embodiment

Figure 1:
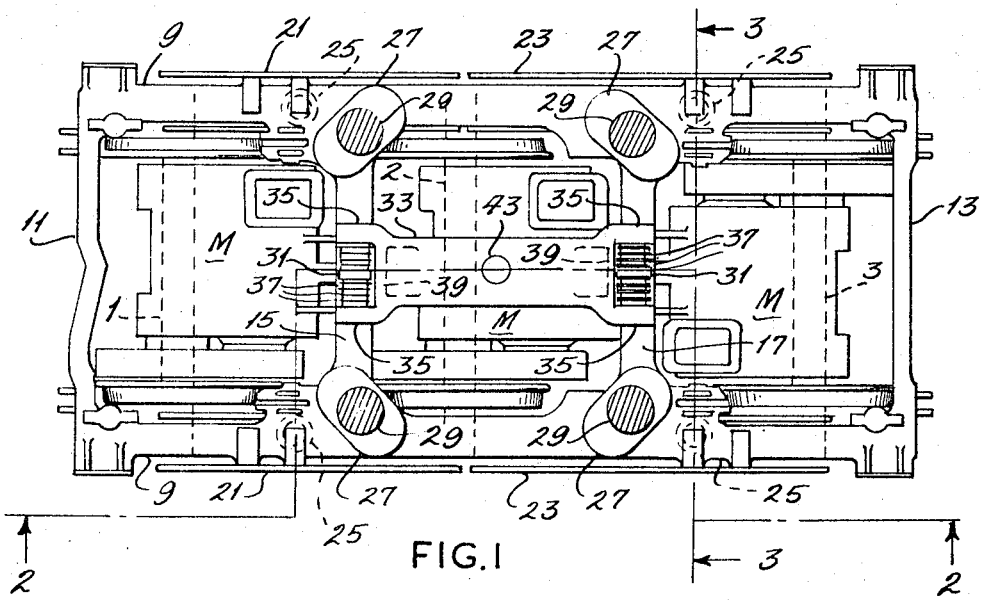
FIG. 1 is a plan view of a truck embodying the invention, taken along line 1—1 of FIG. 2.
Figure 2:
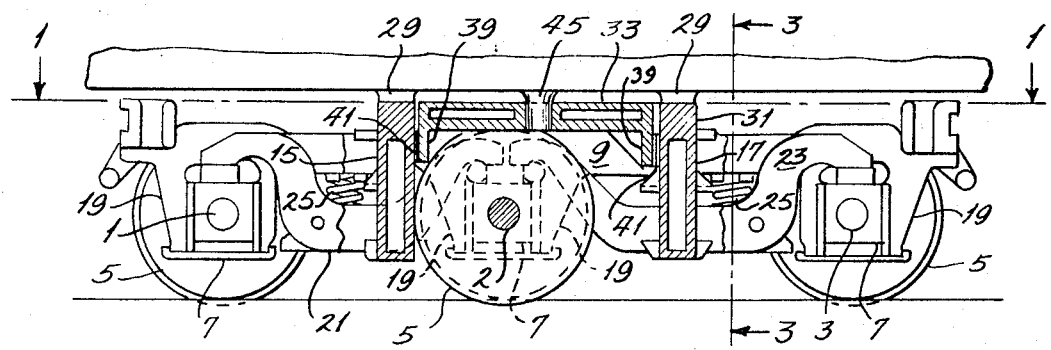
FIG. 2 is a side elevational view of the truck illustrated in FIG. 1, partially sectionalized along line 2—2 of FIG. 1.
Figure 3:
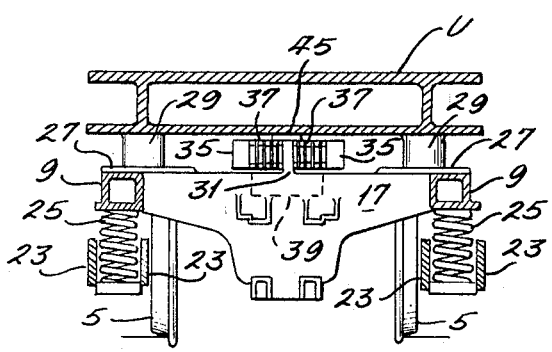
FIG. 3 is a transverse vertical sectional view along lines 3—3 of FIGS. 1 and 2.

The truck comprises three longitudinally spaced axles 1, 2 and 3 each mounting a pair of transversely spaced flanged wheels 5. At their ends, axles 1, 2 and 3 each rotatably mounts journal boxes 7. A rigid truck frame, comprising transversely spaced, longitudinally extending side members 9, end transoms 11 and 13, longitudinally outward of both end axles, and intermediate transoms 15 and 17 disposed intermediate end axle 1 and middle axle 2, and middle axle 2 and end axle 3 respectively, includes pair of pedestal legs 19 depending from side members 9 and vertically slidably receiving journal boxes 7.

For supporting the frame from the axles, longitudinally extending equalizer bars 21 and 23 are supported at their ends on journal boxes 7 of axles 1 and 2, and of axles 2 and 3, respectively, and mount, intermediate their ends, upright coil springs 25 which underlyingly engage frame side members 9.

Separate traction motors M are mounted on each axle, with their nose portions supported on an adjacent transom in the usual manner.

For supporting locomotive underframe U on the truck, four transversely and longitudinally upwardly facing horizontal bearing surfaces 27, 27, 27, 27 are formed on the truck frame at the juncture of frame side members 9 and intermediate transoms 15 and 17. Bearing surfaces 27 are each elongated normal to radii from the central vertical axis of the truck. Underframe U is formed with four depending feet 29, 29, 29, 29 slidably resting on truck frame bearing surfaces 27.

To provide a swivel center for the truck and to effect the transmission of tractive forces from the truck to the underframe, while permitting limited lateral movement of the underframe relative to the truck frame, transoms 15 and 17 are each formed at their centers with an upstanding abutment 31, and a shallow beam 33, bifurcated at its ends to form transversely spaced extremities 35, extends between transoms 15 and 17 and is slidably supported thereon by its extremities 35, which embrace transom abutments 31. For yieldably centering beam 33 transversely of the truck, resilient sandwiches comprising elastomeric pads 37 interleaved with metal plates are interposed between each transom abutment 31 and both adjacent beam extremities 35.

For transmitting longitudinal (tractive and braking) forces from the truck frame to the locomotive underframe, beam 33 is formed at both of its ends with a depending transverse abutment 39 adjacent the inner transverse faces of transoms 15 and 17, and the opposing faces of abutment 39 and transoms 15 and 17 are provided with frictionally engaging renewable chafing plates 41. At its center, beam 33 is formed with a vertical cylindrical aperture 43 and a cylindrical post 45, rigidly depending from underframe U, is pivotally received in aperture 43 to provide a swivel center for the truck and to transmit longitudinal forces from the truck frame to the underframe.

Because of the vertically rigid support of the underframe on the truck frame through underframe feet 29 and truck frame bearing surfaces 27, longitudinal tilting of the truck frame relative to the underframe and consequent transference of load between the axles does not occur. Because beam 33 carries no vertical load, it is sufficiently shallow vertically to clear the middle axle traction motor without requiring elevation of the underframe.

The details of the construction described herein may be varied without departing from the spirit of the invention, and the exclusive use of such modifications is contemplated.

I claim:

1. A railway truck comprising three wheeled axles spaced apart longitudinally of the truck, a rigid frame supported on said axles and comprising transversely spaced longitudinally extending side members and a pair of transverse transom members located respectively between adjacent axles, transversely spaced upwardly facing bearing surfaces on said frame between the middle axle and each end axle and adapted to slidably engage downwardly facing bearing surfaces on a supported underframe, and a shallow longitudinally extending beam supported at its ends on said transoms and held against longitudinal movement relative to said transoms, said beam having at its center vertical pivot forming means engageable with cooperating pivot forming means on the underframe.

2. A railway truck according to claim 1 in which said beam is movable transversely of said truck frame.

3. A railway truck according to claim 2 including means carried by said transoms for centering said beam transversely of said frame.

4. A railway truck according to claim 3 in which said centering means comprises resilient elements disposed between said transoms and said beam.

5. A railway truck according to claim 4 in which said transoms and said beam have opposing longitudinal surfaces, said resilient elements being disposed between said opposing surfaces to yieldingly resist lateral movements of said beam away from its transversely centered position.

6. A railway truck according to claim 2 wherein the ends of said beam are bifurcated to form transversely spaced extremities overlying said transoms, said transoms each having an upstanding abutment between said beam extremities, and resilient elements between each said transom abutment and the adjacent beam extremities compressible to yieldingly resist transverse movement of said beam from centered position and expansible to return said beam to centered position.

7. A railway truck according to claim 2 in which both said transoms and said beam have opposing transverse vertical surfaces preventing substantial movement of said beam lengthwise of the truck whereby to transmit tractive and braking forces from said frame to said beam.

8. A railway truck according to claim 7 in which the ends of said beam are transversely slidably carried by the tops of said transoms and said beam has depending brackets adjacent said transoms, said opposing transverse surfaces comprising a surface of said brackets and a transverse surface of said transoms.

9. A railway truck according to claim 3 in which separate longitudinally extending equalizing beams are supported at their ends by adjacent axles at each side of the truck, there being upright springs carried by said equalizing beams intermediate said axles and forming the support of the frame thereon.

10. A railway locomotive including a truck comprising three wheeled axles spaced apart longitudinally of the truck, separate longitudinally extending equalizing beams supported at their ends by adjacent axles at each side of the truck, upright springs carried by said equalizing beams intermediate said axles, a rigid frame supported on said springs and comprising transversely spaced longitudinally extending side members and a pair of transverse transom members located respectively between adjacent axles, transversely spaced upwardly facing bearing surfaces on said frame between the middle axle and each end axle, a shallow longitudinally extending beam supported at its ends on said transoms and held against longitudinal movement relative to said transoms, said beam having at its center a cylindrical aperture, and an underframe having downwardly facing bearing surfaces in horizontally slidable engagement with said truck frame bearing surfaces and a rigidly depending cylindrical element pivotally received in said cylindrical aperture in said beam.

References Cited
UNITED STATES PATENTS

| | | | |
|---|---|---|---|
| 844,151 | 2/1907 | Lindenthal | 105—199 |
| 1,544,125 | 6/1925 | Bell | 105—199 X |
| 2,499,087 | 2/1950 | Bourdon | 105—199 |
| 2,632,405 | 3/1953 | Ivatt | 105—199 X |
| 2,705,924 | 4/1955 | Travilla et al. | 105—199 X |
| 2,925,789 | 2/1960 | Wintemberg | 105—199 X |

ARTHUR L. LA POINT, *Primary Examiner.*

H. BELTRAN, *Assistant Examiner.*

U.S. Cl. X.R.

105—189, 196, 199